United States Patent [19]

Grata

[11] Patent Number: 5,133,633
[45] Date of Patent: Jul. 28, 1992

[54] LOW-ANGLE SLIDABLY SUPPORTED ROLL-BACK VEHICLE TRANSPORT APPARATUS

[75] Inventor: Francis S. Grata, Chambersburg, Pa.

[73] Assignee: Jerr-Dan Corp., Greencastle, Pa.

[21] Appl. No.: 617,116

[22] Filed: Nov. 21, 1990

[51] Int. Cl.⁵ .............................................. B60P 1/04
[52] U.S. Cl. ................................................... 414/477
[58] Field of Search ............................ 414/477–480, 414/482, 491, 494; 298/12, 14–16; 410/101

[56] References Cited

U.S. PATENT DOCUMENTS

| | | | |
|---|---|---|---|
| 3,043,458 | 7/1962 | Klosek et al. | 414/478 |
| 3,159,294 | 12/1964 | Forsythe, Jr. | 414/478 |
| 3,414,148 | 12/1968 | Bishop | 414/477 |
| 3,471,047 | 10/1969 | Burke | 414/477 |
| 4,353,597 | 10/1982 | Shoup | 298/12 |
| 4,456,420 | 6/1984 | Newhard | 414/478 |
| 4,611,961 | 9/1986 | Van Imperen et al. | 410/101 X |
| 4,715,754 | 12/1987 | Scully | 410/101 X |
| 4,756,658 | 7/1988 | Moore et al. | 414/477 |
| 4,770,592 | 9/1988 | Winter | 414/494 X |
| 4,842,470 | 6/1989 | Hubbard | 414/478 |
| 4,929,142 | 5/1990 | Nespor | 414/477 X |

*Primary Examiner*—David A. Bucci
*Attorney, Agent, or Firm*—Dykema Gossett

[57] ABSTRACT

An improved roll-back apparatus is disclosed having a deck with a sloping portion at a rearward end which contacts the ground to provide both a low approach angle, and a large support area, for initially receiving the weight of a vehicle to be transported. Slidable slide pads are disposed between the deck and a subframe which slidably supports the deck. The slidable slide pads extend the life of the slide pads, along with reducing the amount of required slide pad material necessary to support the deck upon the subframe.

18 Claims, 3 Drawing Sheets

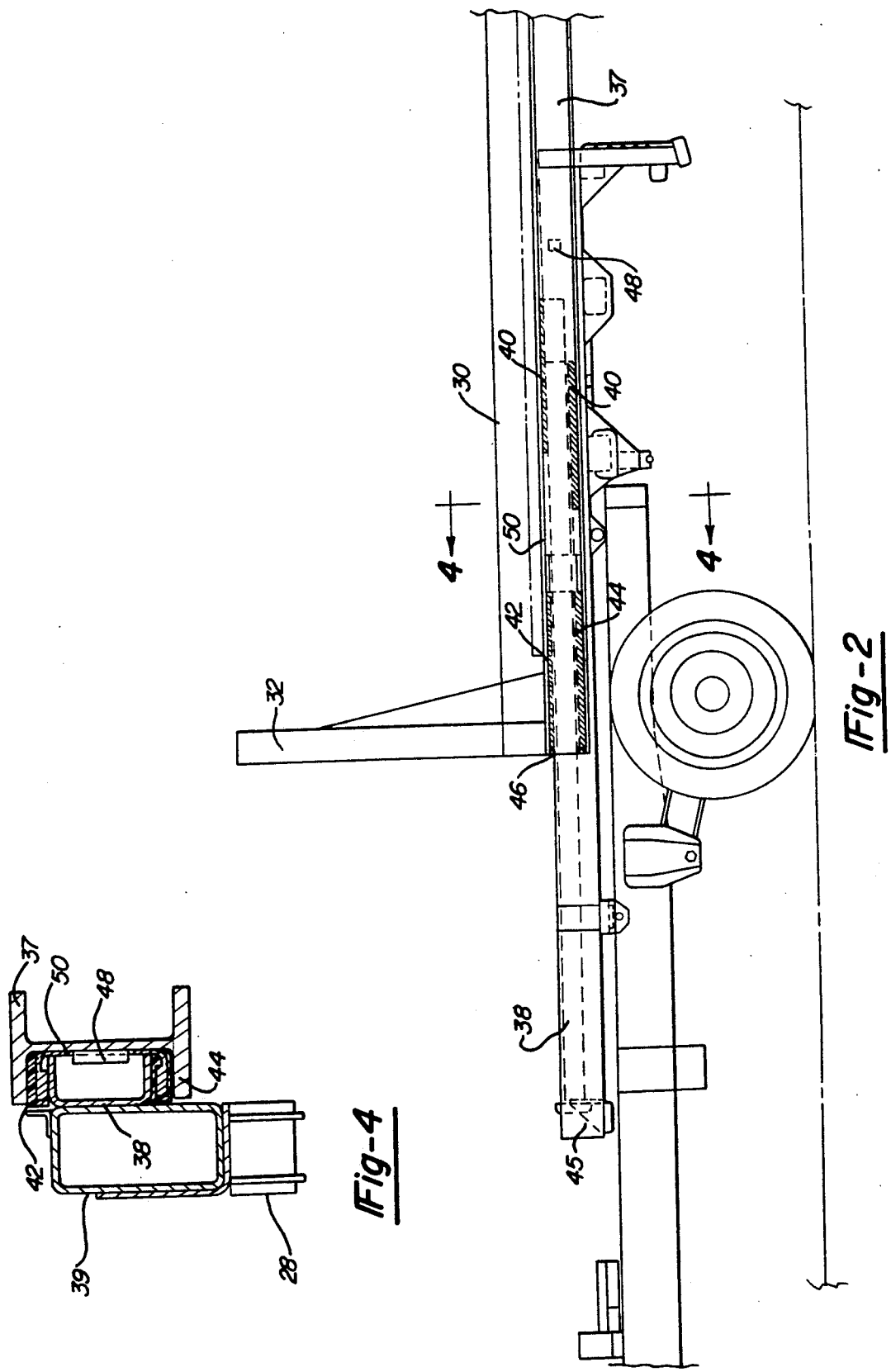

LOW-ANGLE SLIDABLY SUPPORTED ROLL-BACK VEHICLE TRANSPORT APPARATUS

BACKGROUND OF THE INVENTION

This invention relates to a roll-back vehicle transport apparatus which defines a low approach angle with the ground. In addition, the disclosed invention is efficiently slidably supported for movement between transport and loading positions.

Modern devices for transporting vehicles are often of the roll-back type which include a vehicle support surface supported upon a truck bed frame. The support surface is pivotable relative to the bed frame between a transport position, at which it extends parallel to the bed frame, and a loading position, at which it extends at an angle relative to the bed frame and contacts the ground, defining an approach angle. A vehicle to be transported upon the support surface is moved upwardly onto the support surface, and the support surface is then returned to the transport position.

Some problems do exist with roll-back devices. The approach angle is often somewhat steep and it is sometimes difficult to move vehicles having a low ground clearance onto the support surface. Also, when the vehicle to be transported is being moved onto the support surface, it must be moved through the approach angle against the force of gravity. For these reasons it would be desirable to decrease the approach angle that the support surface defines with the ground when in the loading position.

In the prior art, a single point on the support surface contacts the ground and defines an approach angle for a vehicle to be transported on the roll-back apparatus. This point contact may result in undesirable stress on the support surface, since the entire weight of a vehicle to be transported is supported at this single point. For this reason it would be desirable to have contact between the support surface and the ground over a greater area.

A typical roll-back support surface includes a subframe which actually pivots relative to the truck bed frame, and a deck portion slidably supported on the subframe. A hydraulic cylinder is driven to pivot the subframe and deck relative to the truck bed frame. The deck portion extends further forward than the subframe when in the transport position. To move the deck to the loading position, it is first driven rearwardly relative to the subframe. Once the deck arrives at the rearward position, the subframe is driven to pivot relative to the truck bed frame. The deck portion is now positioned rearwardly relatively to the subframe and contacts the ground.

When the deck moves relative to the subframe it is often carrying the weight of a vehicle. Thus, it is necessary to adequately support the deck for slidable movement relative to the subframe. Prior art devices have used slide pads fixed to the subframe to provide a sliding bearing for the surfaces between the subframe and the deck.

Problems exist with these prior art arrangements in that slide pads are relatively expensive and become worn relatively quickly. The areas of sliding contact between the subframe and the deck change as the deck moves relative to the subframe, and it has been necessary to have slide pads placed throughout the length of the subframe. It would be desirable to use slide pads of less length than the entire length of the subframe, such that less of the expensive slide pad material is required.

It is an object of the present invention to disclose a roll-back apparatus in which the deck defines both a relatively low approach angle relative to the ground, and in which the deck contacts the ground over a relatively great area compared to prior art arrangements. In addition, it is an object of the present invention to disclose an arrangement in which the deck is slidably supported relatively to the subframe with relatively short, long-lasting slide pads.

SUMMARY OF THE INVENTION

A roll-back apparatus is disclosed in which the deck has an upwardly sloping portion at a rearward end which initially contacts the ground. Due to the upwardly sloping portion, the approach angle for the deck is reduced, and a relatively large area of the deck is in contact with the ground while in the loading position. This facilitates transport of vehicles having low ground clearance and provides a greater support area, reducing stress on the deck. Finally, due to the upwardly sloping portion, there is additional space in the rear of the roll-back apparatus for connection of a tow assembly to tow a second vehicle.

In another aspect of the present invention, slidable slide pads are disposed between a subframe and a deck portion of the roll-back apparatus, and are slidable relative to both, providing an efficient sliding bearing surfaces between the two. Since the slide pads slide relative to both members, the wear on each slide pad is distributed between two faces, thus extending its useful life. Since the slide pads are not fixed to either member they are easily replaceable. In addition, the disclosed slide pads may slide during movement of the deck relative to the subframe, such that they are always at critical positions to fully support the sliding movement between the two. Since the slide pads move to critical support positions, it is not necessary that they cover the entire length of the subframe, and substantially less slide pad material is utilized than is required with prior art devices.

The slidable slide pads are preferably mounted such that they are always in the forwardmost contact position between the subframe and the deck portion when movement between the two initially begins. In the transport position the deck portion extends forwardly of the subframe and the slidable slide pads are in contact with a forward stop on the subframe. The slide pads are thus at the forwardmost contact position between the subframe and the deck portion. As the deck portion moves to the loading portion, the slidable slide pads remain relatively stationary at the forwardmost contact point between the deck portion and subframe for a period of time. Once the deck portion has moved rearwardly through a predetermined distance, a stop member at a forward end of the deck contacts the slidable slide pads, which are then brought rearwardly for the remainder of the travel between the deck portion and the subframe. When the deck portion begins to move forwardly to return to the transport position, the slidable slide pads initially rest against this forward stop on the deck, which is then the forwardmost contact position between the deck and subframe.

With the disclosed arrangement it is ensured that the slide pads are always at a forwardmost contact position when initial movement between the deck portion and the subframe is begun. The weight of the vehicle being transported causes a force moment at this forwardmost position, and it is critical that the deck be supported at the forwardmost contact position, particularly when initially beginning movement.

In other aspects of the present invention, lateral side bars on the deck are removable and may be stored beneath the surface of the deck. This allows a forklift to load a vehicle laterally onto the deck surface. In addition, strap ratchets are disclosed which may be positioned on the deck to tighten straps and secure a vehicle to the deck. Straps may cause less damage to the surface of a vehicle than prior art chains.

These and other objects and features of the present invention can be best understood from the following specification and drawings, of which the following is a brief description.

BRIEF DESCRIPTION OF THE DRAWINGS

FIG. 2 is a side view showing the inventive roll-back apparatus in a step intermediate the transport and loading positions.

FIG. 4 is a cross-sectional view along line 4—4 as shown in FIG. 2.

DETAILED DESCRIPTION OF A PREFERRED EMBODIMENT

Figure 1:
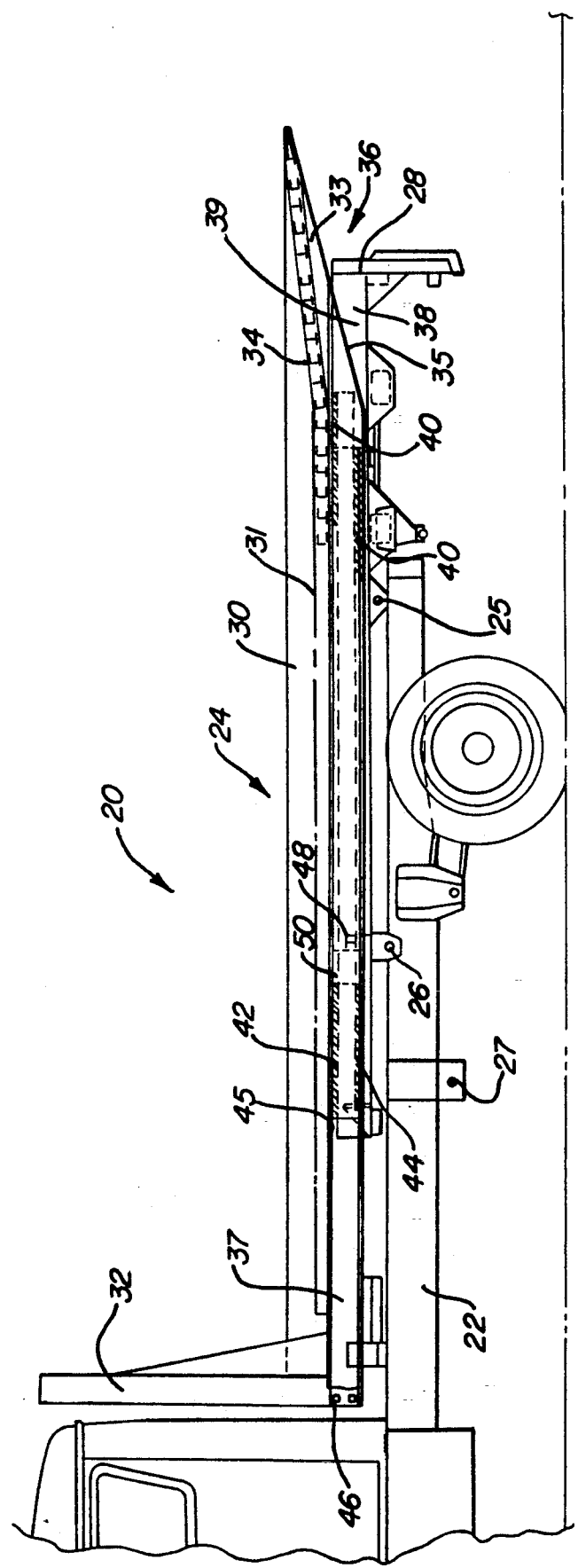
FIG. 1 is a side view showing the inventive roll-back apparatus in a transport position.

Roll-back apparatus 20 is illustrated in FIGS. 1–5 and includes truck bed frame 22 which mounts deck support surface assembly 24 at pivot point 25. A cylinder, not shown, is connected between points 26 and 27 for driving assembly 24 to pivot relative to bed frame 22 and move from the transport position illustrated in FIG. 1 to a loading position, illustrated in FIG. 3. Deck support surface assembly 24 includes subframe 28 pivotally connected at point 25 to truck bed frame 22, and deck portion 30 which is slidable relative to subframe 28. Deck portion 30 defines surface 31 which supports a vehicle to be transported. Forward end 32 of deck portion 30 is defined at one longitudinal end of roll-back apparatus 20 and upwardly sloping portion 33 is defined at the longitudinally rearward end. A top face 34 of upwardly sloping portion 33 extends upwardly at a first angle from surface 31 while a bottom face 35 extends upwardly at a second angle which is somewhat greater than the first angle, such that portion 33 defines a triangle from the side. Upwardly sloping portion 33 provides several benefits in the loading of a vehicle that will be explained with reference to FIG. 3. One benefit of upwardly sloping portion 33 is the provision of additional space 36 in the rear of roll-back assembly 20 for attachment of a tow bar assembly which may be used to tow a second vehicle.

Deck portion 30 comprises opposed side stringer beams 37, which move relative to channel members 38 that are fixed to subframe side tubes 39. A pair of rear fixed slide pads 40 are mounted on channels 38 at each lateral side of subframe 28 to provide a sliding surface between channels 38 and beams 37. Upper and lower slidable slide pads 42 and 44 are disposed at a forward end of subframe 28 when roll back apparatus 20 is in the transport position. A forward stop 45 on subframe 28 defines a forwardmost position for upper and lower slidable slide pads 42 and 44 when in this transport position.

Deck stop 46 is at forward end 32 of deck portion 30. Contact block 48 is fixed to deck 30 and contacts spacers 50, which in turn contact upper and lower slidable slide pads 42 and 44 and hold them against stop 45 when in the transport position.

The movement of roll-back assembly 20 from the transport position illustrated in FIG. 1 to a loading position will be explained with reference to FIGS. 2 and 3. When it is desired to move roll-back assembly 20 to the loading position, deck portion 30 is first driven rearwardly relative to subframe 28 through some conventional means, typically hydraulic cylinders are utilized. Roll-back assembly 20 is illustrated in FIG. 2 with deck portion 30 having been moved rearwardly relative to subframe 28. As deck portion 30 initially begins to move rearwardly from the transport position, slidable slide pads 42 and 44 remain relatively stationary and do not move with deck portion 30. Pads 42 and 44 thus remain in the forwardmost contact position between subframe 28 and deck 30.

Once deck portion 30 has moved rearwardly to the extent that deck stop 46 contacts slidable slide pads 42 and 44, the slidable slide pads begin to move rearwardly along with deck portion 30. Once deck stop 46 contacts pads 42 and 44, it has become the forwardmost contact position between subframe 28 and deck 30. The rearward movement continues until the members arrive at the position illustrated in FIG. 2.

When in the position illustrated in FIG. 2, upper and lower slidable slide members 42 and 44 abut deck stop 46 at the forwardmost contact surface between deck 30 and subframe 28, slidably supporting the surfaces between the two. Fixed slide pads 40 also support movement between the two members.

Figure 3:
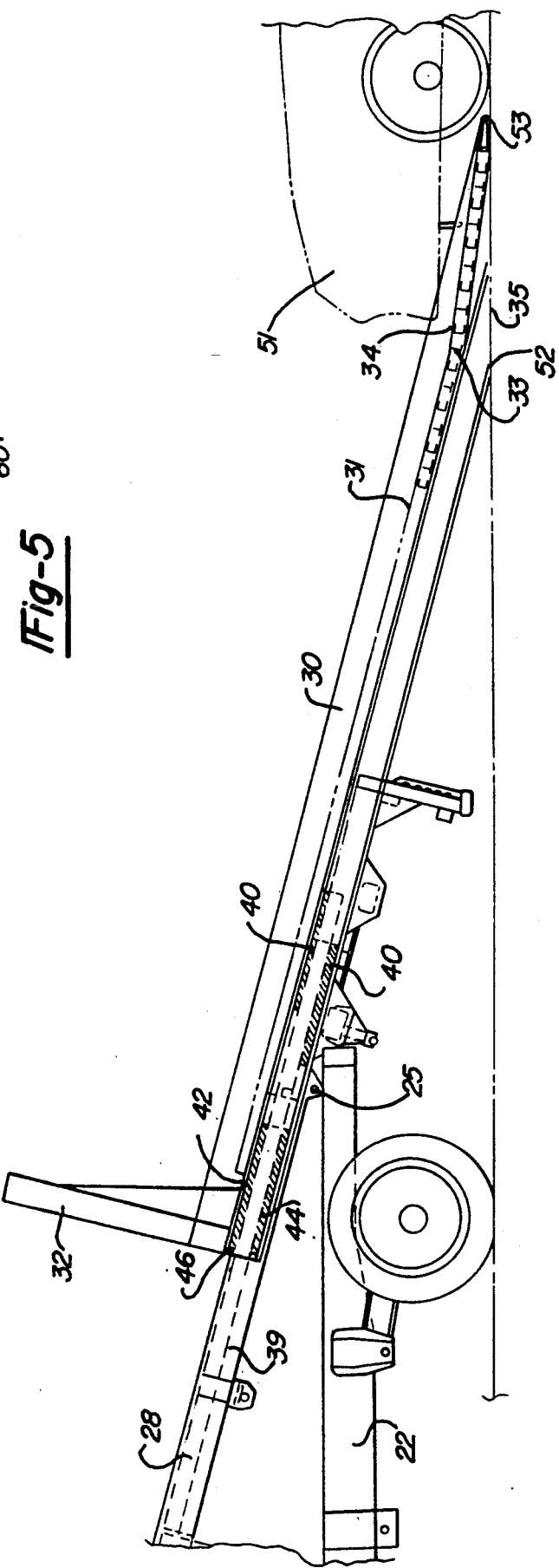
FIG. 3 is a side view of the inventive roll-back apparatus is a loading position.

FIG. 3 illustrates roll-back assembly 20 in the loading position. Subframe 28 has been pivoted to extend at an angle relative to bed frame 22. Stop 46 still contacts upper and lower slide pads 42 and 44, and upwardly sloping portion 33 contacts the ground, providing a relatively low approach angle, since top face 34 defines a lower approach angle than the remainder of surface 31.

Bottom face 35 contacts the ground over an area extending from point 52 to point 53. This is a relatively large area compared to prior art arrangements, where there was effectively single point contact between a deck and the ground. One can visualize that the contact between deck 30 and the ground would be at a single point if the bottom face of deck 30 were a plane parallel to the top face. If this were the case, a single point directly beneath point 53 would contact the ground at a point somewhat intermediate points 52 and 53.

Once in the loading position, vehicle 51 may be moved onto surface 31, and roll-back apparatus 20 may then move back to the transport position. Initially, subframe 28 is pivoted relative to truck bed 22 to return to the position illustrated in FIG. 2. Deck portion 30 is then moved forwardly relative to subframe 28 to return to the transport position illustrated in FIG. 1.

During the initial forward movement of deck portion 30 relative to subframe 28, slidable slide pads 42 and 44 remain relatively stationary. Contact block 48 soon reaches a position such that it contacts spacers 50 and begins to bring them, and upper and lower slide members 42 and 44, forwardly. This movement continues until deck portion 30 has returned to the transport position illustrated in FIG. 1. At this position, pads 42 and 44 are adjacent stop 45 on subframe 28.

In each position illustrated in FIGS. 1, 2 and 3 slide pads and 44 are at the forwardmost contact position between subframe 28 and deck portion 30. The forwardmost position generally receives a force moment and supports a large portion of the stress from the weight of a vehicle being transported. In the position shown in FIG. 1, slidable slide pads 42 and 44 abut forward stop 45 on subframe 28. In the position shown in FIGS. 2 and 3, the slidable slide pads 42 and 44 abut forward stop member 46 on deck 30. When the members move between the positions illustrated in FIGS. 1, 2 and 3, there are periods where slidable slide pads 42 and 44 are at intermediate positions along the contact surfaces subframe 28 and deck portion 30. When the members are in the positions where the most stress is received, however, that is the transport position shown in FIG. 1, the loading position shown in FIG. 3 and the position shown in FIG. 2 where the initial forward movement of the deck relative to the subframe is begun, the slidable slide pads are always at the forwardmost contact position.

This inventive placement allows relatively short slide pads 42 and 44 to be utilized such that expensive slide pad material need not be placed along the entire length of subframe 28. In addition, since slide pads 42 and 44 slide relative to both deck 30 and subframe 28, they define two sliding support faces and wear is distributed over both. As such, the slide pads have a relatively long life compared to prior art fixed slide pads. Also, since the slide pads are not fixed to either subframe 28 or deck 30, they may be easily removed for replacement.

FIG. 4 is a cross-sectional view taken along line 4—4 as illustrated in FIG. 2. Stringer beam 37 has a generally C-shaped portion and faces C-shaped channel 38, which is a part of subframe 28. Upper and lower slidable slide pads 42 and 44 are disposed between stringer beams 37 and channels 38. Contact block 48 is affixed to stringer beam 37, and abuts spacers 50, which in turn contacts slide pads 42 and 44.

Figure 5:
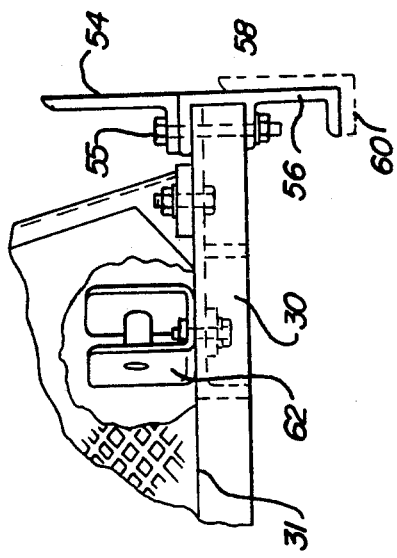
FIG. 5 is a view of a portion of the deck of the inventive roll-back apparatus.

Further features of the invention are illustrated in FIG. 5. Side bars 54 extend upwardly from each lateral side of deck portion 30, and are bolted at 55 to provide stops to prevent a vehicle from sliding laterally off the deck. It may sometimes be desirable, however, to lift a vehicle with a forklift or similar device and move it laterally onto deck 30. Side bars 54 may prevent access to deck 30 from the lateral sides of roll-back apparatus 20. In these situations, side bars 54 may be removed by releasing bolt 55, and mounting side bars 54 on bar 56, as shown in phantom at 60. Bolt 55 can be placed through a bolt hole to fix side bar 54 in this stored position.

Strap ratchets 62 may be disposed on deck 30, and can be used to tighten straps to secure a vehicle upon surface 31. Side bars 54 may include slots to receive these straps. The straps replace commonly used chains which may cause damage to the body of a vehicle.

Preferred embodiments of the present invention have been disclosed, however, a worker of ordinary skill in the art would realize that certain modifications would fall within the scope of this invention and thus the following claims should be studied in order to determine the true scope and content of the invention.

I claim:

1. A roll-back apparatus for transporting vehicles comprising:

a bed frame;
a deck assembly pivotally attached to said bed frame, said deck assembly being pivotally movable relative to said bed frame from a transport position where it extends generally parallel to said bed frame to a loading position where it extends at an angle relative to said bed frame and contacts the ground for loading of a vehicle to be transported; and
said deck assembly comprising a deck portion defining a support surface for supporting a vehicle on a top face thereof, said support surface extending generally along a first top plane, said support surface having a sloping portion at a rearward end that defines a second top plane at an angle relative to said first top plane, said second top plane extending vertically upwardly from said first top plane when said deck assembly is in said transport position, and said sloping portion defining a low approach angle for a vehicle when said deck assembly is in the loading position, said deck also including a bottom face defining a first bottom plane extending generally parallel to said first top plane, and a second bottom plane extending vertically upwardly from said first bottom plane when said deck assembly is in said transport position, said second bottom plane contacting the ground and being parallel to the ground when said deck assembly is in the loading position, said second top plane and said second bottom plane meeting at a rearward point, with an acute angle being defined between said second top plane and said second bottom plane at said rearward point.

2. A roll-back apparatus as recited in claim 1, wherein said sloping portion is generally triangular in cross-section such that it contacts the ground over a relatively large area.

3. A roll-back apparatus as recited in claim 1, wherein said deck assembly requires a subframe pivotally attached to said bed frame with said deck portion being slidably supported on said subframe, said support surface being defined on said deck portion.

4. A roll-back apparatus as recited in claim 3, wherein slidable slide pads are disposed between said subframe and said deck portion, said slidable slide pads being slidable relative to both said subframe and said deck portion.

5. A roll-back apparatus as recited in claim 4, wherein said deck portion is slidably supported on channel members at each lateral side of said subframe, and wherein said slidable slide pads are disposed on said channels.

6. A roll-back apparatus as recited in claim 4, wherein both said subframe and said deck portion have generally C-shaped members, one received within the other, and said slidable slide pads are disposed at both top and bottom contact surfaces defined between said C-shaped members.

7. A roll-back apparatus as recited in claim 4, wherein when said deck assembly is moved from said transport position to said loading position, said deck portion is initially moved rearwardly relative to said subframe, said deck portion having a deck stop at a forward end thereof to contact said slidable slide pads and move them rearwardly with said deck portion, said deck portion moving for a first distance before said deck stop contacts said slidable slide pads and moves them, once said deck portion has been moved rearwardly said subframe and said deck portion are caused to pivot relative to said bed until said upwardly sloping portion contacts the ground, said deck assembly then being in the loading position, said deck assembly being moved from the loading position to a transport position by first pivoting said subframe and said deck portion relative to said bed, and then moving said deck portion forwardly relatively to said subframe, said deck portion having a contact block at an intermediate position to contact said slide pads and move them forwardly along with said contact block, said deck portion moving for a first distance before said contact block contacts said slidable slide pads which are then brought forwardly along with said deck portion to the transport position.

8. A roll-back apparatus as recited in claim 7, wherein said slidable slide pads contact a forward stop on said subframe when in the transport position.

9. A roll-back apparatus as recited in claim 7, wherein a pair of slide pads are fixed to one of said subframe and said deck portion at a position longitudinally rearward of the position of the slidable slide pads.

10. A roll-back apparatus as recited in claim 1, wherein said deck assembly has upwardly extending side bars disposed on each lateral side, said side bars being removable and storable beneath said deck assembly.

11. A roll-back apparatus as recited in claim 1, wherein said deck assembly comprises a plurality of strap ratchets such that straps may be attached and tightened upon said deck assembly to firmly secure a vehicle in the transport position.

12. A roll-back apparatus for transporting vehicles comprising:
  a bed frame;
  a deck assembly including a subframe pivotally attached to said bed frame and a deck portion slidably supported on said subframe, said deck assembly being pivotally movable relative to said bed frame between a transport position where it extends generally parallel to said bed frame and a loading position where it extends at angle relative to said bed frame and said deck portion contacts the ground for loading of a vehicle to be transported; and
  slidable slide pads disposed between said subframe and said deck portion, said slide pads being slidable relative to both said subframe and said deck portion.

13. An apparatus as recited in claim 12, wherein said deck portion is slidably supported on channel members at each lateral side of said subframe, and wherein said slidable slide pads are disposed on said channel members.

14. An apparatus as recited in claim 12, wherein both said subframe and said deck portion have generally C-shaped members, one received within the other, and said slidable slide pads are disposed at both top and bottom contact surfaces defined between said C-shaped members.

15. A roll-back apparatus as recited in claim 12, wherein when said deck assembly is moved from said transport position to said loading position, said deck portion is initially moved rearwardly relative to said subframe, said deck portion having a deck stop at a forward end thereof to contact said slidable slide pads and move them rearwardly with said deck portion, said deck portion moving for a first distance before said deck stop contacts said slidable slide pads and moves them, once said deck portion has been moved rearwardly said subframe and said deck portion are caused to pivot relative to said bed until said deck portion contacts the ground, said deck assembly then being in the loading position, said deck assembly being moved from the loading position to a transport position by first pivoting said subframe and said deck portion relative to said bed, and then moving said deck portion forwardly relatively to said subframe, said deck portion having a contact block at an intermediate position to contact said slide pads and move them forwardly along with said contact block, said deck portion moving for a first distance before said contact block contacts said slidable slide pads which are then brought forwardly along with said deck portion to the transport position.

16. A roll-back apparatus as recited in claim 15, wherein said slidable slide pads contact a forward stop on said subframe when in the transport position.

17. A roll-back apparatus as recited in claim 12, wherein a pair of slide pads are fixed to one of said subframe and said deck portion at a position longitudinally rearward of the position of the slidable slide pads.

18. A roll-back apparatus for transporting vehicles comprising:
  a bed frame;
  a deck assembly pivotally attached to said bed frame, said deck assembly being pivotally movable relative to said bed frame from a transport position where it extends generally parallel to said bed frame to a loading position where it extends at an angle relative to said bed frame and contacts the ground for loading of a vehicle to be transported; and
  said deck assembly comprising a deck portion defining a support surface for supporting a vehicle on a top face thereof, said support surface extending generally along a first top plane, said support surface having a sloping portion at a rearward end that defines a second plane at an angle relative to said first plane, said second plane extending vertically upwardly from said first plane when said deck assembly is in said transport position, and said sloping portion contacting the ground and defining a low approach angle for a vehicle when said deck assembly is in the loading position, said second plane extending to the rearward end of the platform and being at a small acute angle relative to the ground when in the loading position, and said first plane defining a greater angle with the ground than said second plane when in the loading position.

* * * * *